Patented Oct. 27, 1931

1,828,846

UNITED STATES PATENT OFFICE

JAMES B. PIERCE, JR., OF CHARLESTON, WEST VIRGINIA

MANUFACTURE OF BLANC FIXE

No Drawing.     Application filed May 16, 1928.   Serial No. 278,353.

This invention relates to the manufacture of blanc fixe and has for its object certain improvements in the method of manufacturing blanc fixe. The invention also contemplates the recovery of valuable by-products, such as sodium sulfate, in the manufacture of blanc fixe.

In the heretofore customary practice of manufacturing blanc fixe (barium sulfate, $BaSO_4$), methods and materials are employed which yield a reactive product. That is to say, the product is either alkaline or acid. The product is, moreover, of relatively large and non-uniform particle size, and for the most part crystalline in structure. A method frequently employed in the manufacture of barium sulfate is that of bringing together sulfuric acid and barium carbonate. The barium sulfate product obtained in this manner is reactive, non-uniform and contains a large proportion of coarse particles that are crystalline in structure.

In the use of the blanc fixe as a pigment in printing inks, it is desirable that the blanc fixe be non-reactive with the copper plates, etc., used in the printing operation. The blanc fixe products heretofore on the market have generally been reactive, due either to an alkaline or acidic condition. There is therefore a marked need in the industry of a blanc fixe pigment that is non-reactive.

My investigations have led to improvements in the method of manufacturing blanc fixe by which a product may be obtained that is substantially neutral, or non-reactive. Moreover, the product is amorphous in structure, relatively fine sized, and substantially uniform in particle size. The particles appear to be spherical in shape.

According to my invention blanc fixe is produced by the interaction of sodium acid sulfate with barium carbonate.

In accordance with the practice of my invention, sodium acid sulfate and barium carbonate are made to react with one another in the form of a slurry in a suitable vessel to effect the production of blanc fixe:

(1)   $2NaHSO_4 + BaCO_3 = \underline{BaSO_4} + Na_2SO_4 + CO_2 + H_2O$

As a result of the reaction, a barium sulfate precipitate and sodium sulfate in solution are formed. The reaction mixture of barium sulfate particles and sodium sulfate liquor is suitably treated to effect the separation of the two essential constituents. To this end the mixture may be allowed to stand for some time in the reaction vessel, or in a settling tank, until the barium sulfate solids settle to the bottom and the liquid sodium sulfate gathers as a top layer which may be decanted. The sodium sulfate liquor may be suitably treated to recover the sodium sulfate.

The acidic barium sulfate is then washed or leached with water to completely remove the sodium sulfate, and until the wash or leach water becomes alkaline, as will be more particularly pointed out below. The barium sulfate particles are subjected to this washing treatment until they are substantially neutral, or non-reactive.

While the starting materils, sodium acid sulfate and barium carbonate, may be derived from various sources, in the present practice of the invention I make use of nitre cake obtained in the manufacture of nitric acid. It is believed that the present invention will be better understood by considering in brief detail the nature of nitre cake, since the physical and chemical characteristics of the blanc fixe obtained in the practice of the invention appear to be influenced by the same.

Nitric cake is the retort residue remaining in the manufacture of nitric acid when Chile saltpeter ($NaNO_3$) is treated with surfuric acid at elevated temperatures:

(2)     $NaNO_3 + H_2SO_4 = \underline{NaHSO_4} + HNO_3$
(3)     $2NaNO_3 + H_2SO_4 = Na_2SO_4 + 2HNO_3$
(4)     $NaNO_3 + 2H_2SO_4 = NaH_3(SO_4)_2 + HNO_3$
(5)     $NaNO_3 + NaH_3(SO_4)_2 = \underline{NaHSO_4} + HNO_3$ Since a slight excess of sulfuric acid is employed to effect a substantial complete conversion of the Chile saltpeter, some free sulfuric acid remains in the nitre cake. Moreover, the nature of the operation is such that some sodium sulfate is also undoubtedly formed, probably due to the temperature at which the main reaction is conducted. Various impurities, originally present in the Chile saltpeter, such as iron compounds, are left with the nitre cake residue.

The nitre cake is dissolved in water in order to settle out acid- and water-insoluble impurities. The acid- and water-soluble impurities, however, go into solution with the sodium acid sulfate, and must be contended with in the practice of the invention to obtain a relatively pure blanc fixe.

In the present practice of the invention I employ barium carbonate in the form of a washed slurry obtained in accordance with the disclosure in my United States Letters Patent No. 1,634,338. According to the invention therein disclosed, a highly pure barium carbonate product may be prepared by passing carbon dioxide gas into barium sulfide liquor while inhibiting the decomposition of the oxy-sulfur compound of barium normally present in the barium sulfide liquor by preserving approximately one-half of the barium content of the original barium sulfide liquor in the form of barium sulfhydrate throughout the course of the reaction, and then separating the resultant barium sulfhydrate from the barium carbonate so obtained.

In the presence of water, barium sulfide hydrolyzes to form barium hydrate and barium sulfhydrate:

(6) $\quad 2BaS + 2H_2O = Ba(OH)_2 + Ba(SH)_2$

When carbonated with carbon dioxide gas, the barium hydrate is converted to barium carbonate:

(7) $\quad CO_2 + Ba(OH)_2 = \underline{BaCO_3} + H_2O$

The invention will perhaps be better understood by a consideration of its practice on a plant scale. 48,000 pounds of nitre cake liquor at 68° Tw., containing 5,120 pounds of sulfuric acid and 19,350 pounds of sodium sulfate, and 8,700 pounds of barium carbonate in the form of a 10–20% slurry were brought together in a reaction tank. The reaction mixture was suitably stirred to insure as complete a conversion as practicable.

In conformity with Equation (1) above set out, which is here reproduced for convenience:

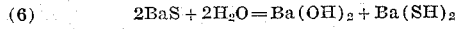
$2NaHSO_4 + BaCO_3 = \underline{BaSO_4} + Na_2SO_4 + CO_2 + H_2O$ a barium sulfate precipitate and a sodium sulfate liquor were formed. Due to the presence of some free sulfuric acid in the nitre cake, some barium sulfate will be formed in accordance with the following secondary reaction:

(8) $\quad H_2SO_4 + BaCO_3 = \underline{BaSO_4} + CO_2 + H_2O$

A second side reaction takes place between the sodium sulfate and barium carbonate by which there is formed some barium sulfate and sodium carbonate:

(9) $\quad Na_2SO_4 + BaCO_3 = \underline{BaSO_4} + Na_2CO_3$

A third side reaction takes place between the sulfuric acid and sodium carbonate by which additional sodium sulfate is formed.

(10) $\quad H_2SO_4 + Na_2CO_3 = Na_2SO_4 + CO_2 + H_2O$

As a result of the main reaction (1) and the side or secondary reactions (8), (9) and (10), substantially all of the barium carbonate is converted to barium sulfate. Less than 0.25% barium carbonate remains with the barium sulfate precipitate.

The barium sulfate particles settled to the bottom of the tank, and the acid sodium sulfate liquor formed as an upper layer. The sodium sulfate liquor was decanted, and the barium sulfate solids repeatedly washed to remove the last traces of acid and substantially all of the sodium sulfate. The solids were washed until the wash water was alkaline.

There must be sufficient acidity to the original sodium sulfate liquor to keep the impurities in the nitre cake liquor and the barium carbonate slurry in solution, so that they will not precipitate out and contaminate the newly formed barium sulfate particles. As indicated above, the nitre cake will frequently contain acid- and water-soluble impurities, such as iron compounds. The barium carbonate slurry will usually contain appreciable amounts of acid-soluble sulfur compounds. If the aqueous barium sulfate mixture obtained as a result of the reaction taking place in the mixing tank should be alkaline, the soluble iron compounds would react with the soluble sulfur compounds, for example, to form a precipitate of black iron sulfides. These iron sulfides would then collect with the barium sulfate particles and thus unduly contaminate the same. On the other hand, if the reaction mixture in the tank is acidic, the iron and sulfur compounds will remain in solution and can be decanted together with the sodium sulfate liquor.

As previously indicated, the acidic barium sulfate particles are then washed until the wash waters are alkaline. This change is made possible by the fact that the barium sulfate made according to the invention is amorphous in character, and has the power of adsorption which it exercises on the barium carbonate. Barium sulfate made in accordance with the above outlined procedure adsorbs from 0.1–0.2% barium carbonate. Since barium carbonate is a base, its alkalinity serves to neutralize the sulfuric acid in the weak wash water.

The barium sulfate is washed to substantial neutrality. Thus, the barium sulfate may be washed until it reacts alkaline to methyl orange indicator, and acid to phenolphthalein indicator. As a result of the washing operation, it will also be found that the sulfur compounds are completely removed, since a test with silver nitrate will not evidence their presence. The thus washed particles of barium sulfate are then filtered and appropriately dried.

The final blanc fixe product is substantially neutral, or non-reactive, has a very fine particle size, is amorphous in structure, is substantially uniform in particle size, and the particles appear to be spherical in form. The particles measure in maximum dimension not more than approximately one micromillimeter. While I cannot offer a definite explanation of why the practice of the invention results in an amorphous blanc fixe product, I am inclined to believe that it is due, in part at least, to the presence of sodium sulfate in the reaction mixture. Some sodium sulfate is adsorbed on the surfaces of the individual barium sulfate particles, to the extent of about 0.2%.

The slightly acid sodium sulfate solution decanted from the barium sulfate particles, together with the wash waters, if desired, containing the acid- and water-soluble iron and sulfur compounds, may be completely neutralized, for example, with soda ash or other alkaline soda compounds. This will precipitate the impurities, which may be settled out while the relatively pure sodium sulfate liquor is decanted off. The sodium sulfate liquor may be used as such, or it may be evaporated to a very pure anhydrous sodium sulfate, or crystallized for Glauber salts.

I claim:

1. The method of manufacturing blanc fixe which comprises bringing together sodium acid sulfate and barium carbonate in the form of an aqueous slurry, and separating the resulting barium sulfate particles from the sodium sulfate liquor.

2. The method of manufacturing blanc fixe which comprises bringing together sodium acid sulfate and barium carbonate in the form of an acid slurry, and separating the resulting barium sulfate particles from the sodium sulfate liquor.

3. The method of manufacturing blanc fixe which comprises bringing together sodium acid sulfate and barium carbonate in the form of an acid slurry, separating the resulting barium sulfate particles from the sodium sulfate liquor, and washing the barium sulfate particles to substantial neutrality.

4. The method of manufacturing blanc fixe which comprises bringing together an aqueous solution of nitre cake and a slurry of barium carbonate, and separating the resulting barium sulfate particles from the sodium sulfate liquor.

5. The method of manufacturing blanc fixe which comprises forming a reaction mixture of sodium acid sulfate, sodium sulfate and barium carbonate in the form of a slurry, and separating the resulting barium sulfate particles from the sodium sulfate liquor.

6. The method of manufacturing blanc fixe which comprises forming a reaction mixture of sodium acid sulfate, sodium sulfate, sulfuric acid and barium carbonate in the form of a slurry, and separating the resulting barium sulfate particles from the sodium sulfate liquor.

7. The method of manufacturing blanc fixe which comprises reacting an acid solution of nitre cake with a slurry of barium carbonate, separating the barium sulfate solids and the sodium sulfate liquor, changing the acid sodium sulfate liquor to the alkaline state to precipitate out impurities, and recovering the sodium sulfate.

8. The method of manufacturing blanc fixe which comprises bringing sodium acid sulfate and barium carbonate in the presence of water into reactive relation to one another, settling the resulting barium sulfate particles to the bottom of the mixture, and decanting the sodium sulfate liquor.

9. The method of manufacturing blanc fixe according to the preceding claim in which the barium sulfate particles are washed with water to remove sodium sulfate.

In testimony whereof I affix my signature.

JAMES B. PIERCE, Jr.